United States Patent
Babak (10) Patent No.: US 11,085,366 B2
(45) Date of Patent: Aug. 10, 2021

(54) ROTATABLE VALVE FOR TURBOCHARGER SYSTEM WITH PLURAL VOLUTE MEMBERS

(71) Applicant: Garrett Transportation I Inc, Torrance, CA (US)

(72) Inventor: Martin Babak, Velka Bites (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 0 days.

(21) Appl. No.: 16/860,310

(22) Filed: Apr. 28, 2020

(65) Prior Publication Data
US 2020/0256245 A1    Aug. 13, 2020

Related U.S. Application Data

(63) Continuation of application No. 15/592,504, filed on May 11, 2017, now Pat. No. 10,677,150.

(51) Int. Cl.
*F02B 37/18* (2006.01)
*F16K 37/00* (2006.01)
(Continued)

(52) U.S. Cl.
CPC .............. *F02B 37/183* (2013.01); *F01D 5/04* (2013.01); *F01D 17/105* (2013.01); *F01D 25/24* (2013.01);
(Continued)

(58) Field of Classification Search
CPC ............ F02B 37/183; F02B 37/025; F02B 2037/122; F02B 37/22; F02B 37/186;
(Continued)

(56) References Cited

U.S. PATENT DOCUMENTS 4,177,006 A    12/1979 Nancarrow
4,526,004 A    7/1985 French et al.
(Continued)

FOREIGN PATENT DOCUMENTS

DE    202014009873 U1    4/2016
WO    2016094265 A1    6/2016
WO    2016094360 A1    6/2016

OTHER PUBLICATIONS

Automation Feedback Controls, 2015, Encyclopedia Britannica (Year: 2015).

*Primary Examiner* — Audrey K Bradley
*Assistant Examiner* — Edward Bushard
(74) *Attorney, Agent, or Firm* — Lorenz & Kopf, LLP (57) ABSTRACT

A turbocharger system includes a valve member with at least one valve passage. The valve member is supported for rotation about an axis of rotation between a first position, a second position, and a third position. The axis of rotation is oriented transverse to flow within a first volute passage and a second volute passage. The valve passage, with the valve member in the first position, provides a cross flow path between the first volute passage and the second volute passage and provides a bypass flow path from at least one of the first and second volute passages and a bypass passage. In the second position, the valve passage provides the cross flow path, and the valve member substantially prevents flow along the bypass flow path. The valve member, in the third position, substantially prevents flow along the cross flow path and the bypass flow path.

20 Claims, 8 Drawing Sheets

(51) Int. Cl.
*F02B 37/02* (2006.01)
*F01D 17/10* (2006.01)
*F02C 6/12* (2006.01)
*F01D 5/04* (2006.01)
*F02D 41/00* (2006.01)
*F16K 11/085* (2006.01)
*F01D 25/24* (2006.01)
*F02B 37/12* (2006.01)

(52) U.S. Cl.
CPC .............. *F02B 37/025* (2013.01); *F02C 6/12* (2013.01); *F02D 41/0007* (2013.01); *F16K 11/0856* (2013.01); *F16K 37/005* (2013.01); *F02B 2037/122* (2013.01); *F02D 2200/101* (2013.01); *F05D 2220/40* (2013.01); *F05D 2250/71* (2013.01)

(58) Field of Classification Search
CPC .. F16K 37/005; F16K 11/0856; F01D 17/105; F01D 5/04; F01D 25/24; F02C 6/12; F02D 41/0007; F02D 2200/101; F05D 2250/71; F05D 2220/40; Y02T 10/12

See application file for complete search history.

(56) References Cited

U.S. PATENT DOCUMENTS

| | | | |
|---|---|---|---|
| 5,943,864 | A | 8/1999 | Sumser et al. |
| 7,051,527 | B2 | 5/2006 | Schmid et al. |
| 7,428,813 | B2 | 9/2008 | Finger et al. |
| 7,562,529 | B2 | 7/2009 | Kuspert et al. |
| 7,637,106 | B2 | 12/2009 | Hertweck et al. |
| 7,934,379 | B2 | 5/2011 | Kuspert et al. |
| 9,926,840 | B2 | 3/2018 | Mawer et al. |
| 2005/0229597 | A1 | 10/2005 | Finger et al. |
| 2010/0024414 | A1 | 2/2010 | Hittle et al. |
| 2014/0230432 | A1 | 8/2014 | Kindl et al. |
| 2016/0208680 | A1 | 7/2016 | McConville et al. |

ROTATABLE VALVE FOR TURBOCHARGER SYSTEM WITH PLURAL VOLUTE MEMBERS

CROSS REFERENCE TO RELATED APPLICATION

This application is a continuation of U.S. patent application Ser. No. 15/592,504 filed May 11, 2017, the entire disclosure of which is incorporated by reference.

TECHNICAL FIELD

The present disclosure generally relates to a turbocharger system and, more particularly, relates to a rotatable valve for a turbocharger system with plural volute members.

BACKGROUND

Some engine systems include one or more turbochargers. Typically, turbochargers include a turbine wheel and a compressor wheel mounted on a common shaft and carried within isolated turbine and compressor housings, respectively. The turbine wheel may be driven in rotation by exhaust gas output by the engine. This, in turn, rotates the compressor wheel for compressing air that is fed to the combustion chambers of the engine. Accordingly, the turbocharger may provide a performance boost and increased efficiency to the engine.

Turbocharger systems may operate in a number of conditions. For example, the turbocharger may operate at relatively low engine speeds, relatively high engine speeds, and at speeds therebetween. As such, the turbocharger system may operate at times when the exhaust mass flow is relatively high, low, and therebetween.

Accordingly, it is desirable to provide an improved turbocharger system that boosts engine performance across a wide range of operating conditions. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger system is disclosed that includes a turbine section with a turbine wheel, a first volute structure with a first volute passage that extends along a first axis, and a second volute structure with a second volute passage that extends along a second axis. The first volute passage is configured to direct flow of exhaust gas toward the turbine wheel. The second volute passage is configured to direct flow of exhaust gas toward the turbine wheel. The turbocharger system also includes a downstream exhaust structure with a downstream exhaust passage configured to receive exhaust gas from the turbine section. The turbocharger system further includes a bypass structure with a bypass passage configured to provide exhaust gas that bypasses the turbine wheel to the downstream exhaust passage. Additionally, the turbocharger system includes a valve member including at least one valve passage. The valve member is supported for rotation about an axis of rotation between a first position, a second position, and a third position. The axis of rotation is oriented transverse to the first axis and the second axis. The valve passage, with the valve member in the first position, provides a cross flow path between the first volute passage and the second volute passage and provides a bypass flow path from at least one of the first volute passage and the second volute passage to the bypass passage. The valve passage, with the valve member in the second position, provides the cross flow path. The valve member, in the second position, substantially prevents flow along the bypass flow path. The valve member, in the third position, substantially prevents flow along the cross flow path and the bypass flow path.

In another embodiment, a turbocharger system is disclosed that includes a turbine section with a turbine wheel, a first volute structure with a first volute passage configured to direct flow of exhaust gas toward the turbine wheel, and a second volute structure with a second volute passage configured to direct flow of exhaust gas toward the turbine wheel. The turbocharger system also includes a downstream exhaust structure with a downstream exhaust passage configured to receive exhaust gas from the turbine section. Furthermore, the turbocharger system includes a bypass structure with a bypass passage configured to provide exhaust gas that bypasses the turbine wheel to the downstream exhaust passage. Also, the turbocharger system includes a valve member with a valve passage. The valve member is supported for rotation about an axis between a first position, a second position, and a third position. The valve passage, with the valve member in the first position, provides a cross flow path between the first volute passage and the second volute passage and provides a bypass flow path from at least one of the first volute passage and the second volute passage to the bypass passage. The valve passage, with the valve member in the second position, provides the cross flow path. The valve member, in the second position, substantially prevents flow along the bypass flow path. The valve member, in the third position, substantially prevents flow along the cross flow path and the bypass flow path.

In a further embodiment, a method of operating a turbocharger system is disclosed. The method includes operating an engine at a variable condition and detecting a current state of the variable condition. The method also includes actuating a valve member in rotation about an axis between a first position, a second position, and a third position relative to a first volute structure, a second volute structure, and a bypass structure based at least partly on the detected current state of the variable condition. The first volute structure defines a first volute passage, the second volute structure defines a second volute passage, and the bypass structure defines a bypass passage. The axis is oriented transverse to a first flow axis of the first volute passage and a second flow axis of the second volute passage. The valve member includes at least one valve passage. The at least one valve passage, with the valve member in the first position, provides a cross flow path between the first volute passage and the second volute passage and provides a bypass flow path from at least one of the first volute passage and the second volute passage to the bypass passage. The at least one valve passage, with the valve member in the second position, provides the cross flow path. The valve member, in the second position, substantially prevents flow along the bypass flow path. The valve member, in the third position, substantially prevents flow along the cross flow path and the bypass flow path.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger system with improved characteristics. In particular, example embodiments include a turbocharger system with at least two volute members (e.g., scrolls). The volute members direct exhaust gas flow toward a turbine wheel. The system also includes a bypass structure (i.e., waste gate), which directs exhaust gas to bypass the turbine wheel. The turbocharger system also includes a valve member that is moveable (e.g., rotatable) between different positions to vary the flow between the volute members and the bypass structure. The valve member may be precisely controlled for movement between these various positions. Accordingly, the turbocharger system may provide engine boost at a wide variety of operating conditions.

Furthermore, the valve member may include other features that provide various advantages. For example, the valve member may be oriented such that its rotational axis is oriented transverse to the flow axis of the twin scroll structures. The valve member may be partly received in the first scroll structure and partly received in the second scroll structure. Accordingly, forces may be distributed substantially evenly across the valve member during operation for effective and accurate controlled movement of the valve member. This configuration may reduce vibration and/or other sources of noise during operation of the turbocharger system. Furthermore, this arrangement may cause the turbocharger system to be relatively compact. Additionally, in some embodiments, the valve member may have a relatively simple shape, such as a cylindrical shape. Accordingly, the valve member may be highly manufacturable. The turbocharger system of the present application may also improve catalyst lightening. Additional details of the present disclosure will be discussed below.

Figure 1:
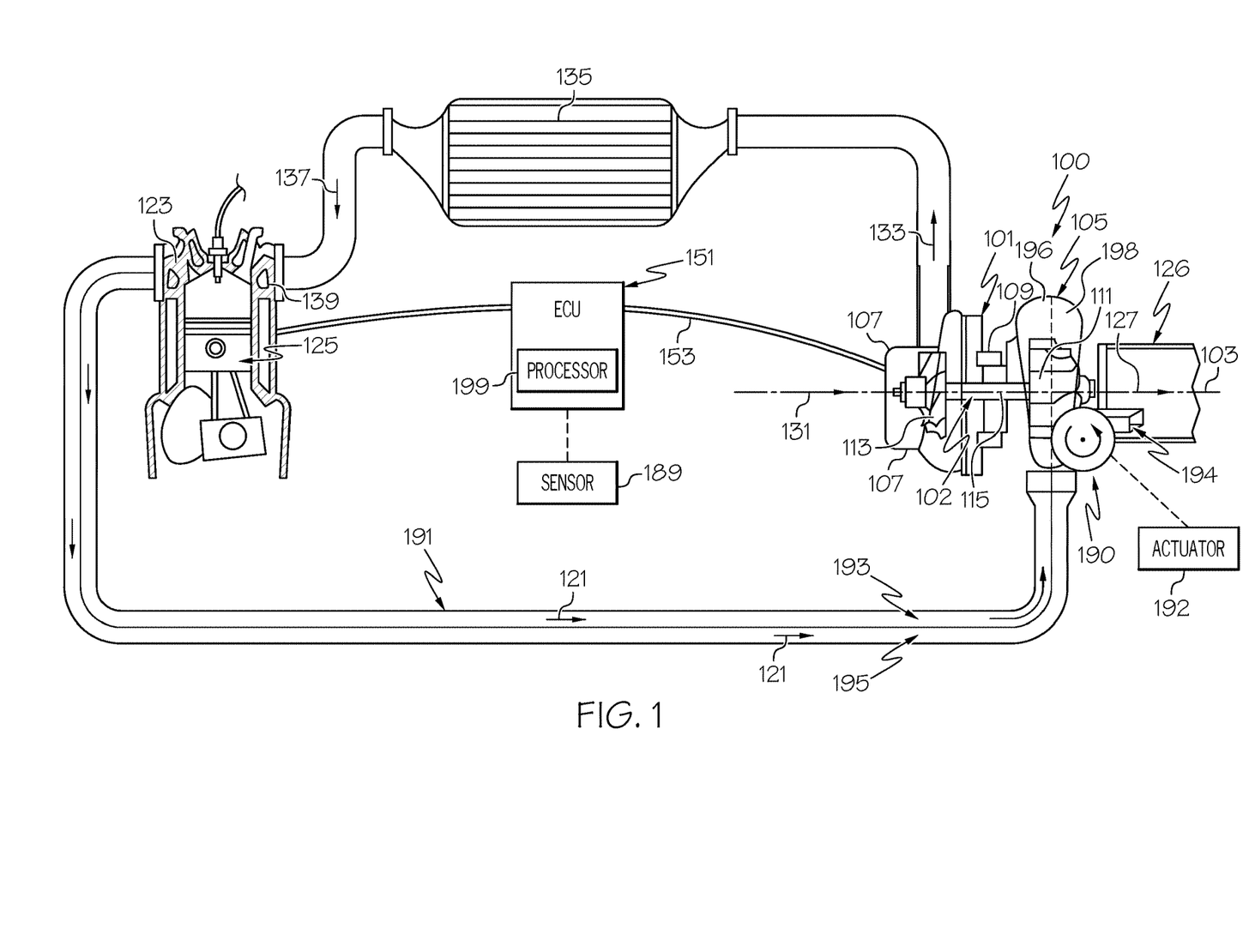
FIG. 1 is a schematic illustration of a turbocharger system configured according to example embodiments of the present disclosure.

FIG. 1 is a schematic view of an example turbocharger system 100 that includes a turbocharger housing 101 and a rotor 102. The rotor 102 is configured to rotate within the turbocharger housing 101 about an axis 103 (axis of rotor rotation). The rotor 102 may be supported for rotation about the axis 103 via one or more bearings (not shown). In some embodiments, the rotor 102 may be rotationally supported by thrust bearings and a plurality of journal bearings. Alternatively, other bearings may be included.

As shown in the illustrated embodiment, the turbocharger housing 101 may include a turbine housing 105, a compressor housing 107, and a bearing housing 109. The bearing housing 109 may be disposed between the turbine and compressor housings 105, 107. Also, in some embodiments, the bearing housing 109 may contain the bearings of the rotor 102.

Additionally, the rotor 102 includes a turbine wheel 111, a compressor wheel 113, and a shaft 115. The turbine wheel 111 is located substantially within the turbine housing 105. The compressor wheel 113 is located substantially within the compressor housing 107. The shaft 115 extends along the axis 103, through the bearing housing 109, to connect the turbine wheel 111 to the compressor wheel 113. Accordingly, the turbine wheel 111 and the compressor wheel 113 may rotate together about the axis 103.

The turbine housing 105 and the turbine wheel 111 cooperate to form a turbine (i.e., turbine section, turbine stage) configured to circumferentially receive a high-pressure and high-temperature exhaust gas stream 121 delivered from an upstream exhaust structure 191 (e.g., one or more upstream exhaust pipes) extending from an exhaust manifold 123 of an internal combustion engine 125. The turbine wheel 111 (and thus the rotor 102) is driven in rotation around the axis 103 by the high-pressure and high-temperature exhaust gas stream 121. The turbine housing 105 may also be connected to a downstream exhaust structure 126 (e.g., one or more downstream exhaust pipes). The turbine housing 105 may release an exhaust gas stream 127 thereto. The exhaust gas stream 127 can be lower-pressure and lower-temperature compared to the exhaust gas stream 121.

The turbocharger system 100 may further include a bypass structure 194 (i.e., a waste gate). The bypass structure 194 may extend from the downstream exhaust structure 126 and may define a passage therein that is fluidly connected to the passage within the downstream exhaust structure 126. As will be discussed, the bypass structure 194 may allow exhaust gas from the upstream exhaust structure 191 to bypass the turbine wheel 111 and flow into the downstream exhaust structure 126.

Also, in some embodiments, the turbine housing 105 may include one or more structures that define distinct flow passages for exhaust gas delivered by the upstream exhaust structure 191. As shown schematically in the embodiment of FIG. 1, the turbine housing 105 may include a first structure 196 and a second structure 198. As will be discussed, the first and/or second structures 196, 198 may define volute passages (i.e., volute flow paths) that spiral about the axis 103 and about the turbine wheel 111. As such, the first and second structures 196, 198 may comprise a twin scroll arrangement of the turbine housing 105. It will be appreciated that the turbine housing 105 may include more than two volute structures without departing from the scope of the present disclosure.

In some embodiments, the first structure 196 may be connected to a first upstream exhaust pipe 193 of the upstream exhaust structure 191, and the second structure 198 may be connected to a second exhaust pipe 195 of the upstream exhaust structure 191. The first exhaust pipe 193 and the second exhaust pipe 195 may be connected to different combustion chambers of the engine 125. Thus, rotation of the turbine wheel 111 is unlikely to be negatively affected by different pulse flow conditions of the exhaust gas flowing through the upstream exhaust structure 191.

The compressor housing 107 and compressor wheel 113 cooperate to form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multi-stage compressor) into a pressurized air stream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The air stream 133 may be channeled through an air cooler 135 (i.e., an intercooler), such as a convectively cooled charge air cooler. The air cooler 135 may be configured to dissipate heat from the air stream 133, increasing its density. The resulting cooled and pressurized air stream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

The turbocharger system 100 may further include a valve structure 190. Generally, the valve structure 190 may regulate and vary flow of exhaust between the first structure 196, the second structure 198, and the bypass structure 194. In some embodiments, the valve structure 190 may move between various positions to regulate and vary the flow between the various structures as will be discussed in detail below.

In some embodiments, the valve structure 190 may have at least one position that allows at least some of the gas stream 121 to flow through the first and/or second structures 196, 198 of the turbine housing 105 to turn the turbine wheel 111 and to flow to the downstream exhaust structure 126. The valve structure 190 may also have at least one position that allows at least some of the gas stream 121 to flow through the bypass structure 194 to the downstream exhaust structure 126, bypassing the turbine wheel 111 in the process. Additionally, the valve structure 190 may have at least one position that allows at least some of the gas stream 121 to flow between the first and second structures 196, 198 of the turbine housing 105.

In some embodiments, the valve structure 190 may be actuated between its various positions by an actuator 192. The actuator 192 may be of any suitable type, such as an electric actuator, a hydraulic actuator, or a pneumatic actuator.

The actuator 192 may be connected to and controlled by the ECU 151. The ECU 151 may also include a processor 199, which is connected to one or more sensors 189. The sensor 189 may be configured to detect various conditions relating to the turbocharger system 100. In some embodiments, for example, the sensor 189 may detect various conditions related to the operation of the engine 125 (e.g., engine speed, exhaust gas mass flow output, etc.). The sensor 189 may provide signals to the processor 199 that correspond to the detected condition(s). The processor 199 may, in turn, generate control signals for the actuator 192 for moving the valve structure 190 according to the conditions detected by the sensor 189. Accordingly, the position of the valve structure 190 (and, thus, flow of the exhaust gas stream 121 relative to the turbocharger system 100) may be controlled. This, in turn, may allow control of the speed of the compressor wheel 113, the mass flow of the air stream 133, etc.

It will be appreciated that the turbocharger system 100 and the valve structure 190 may be arranged and configured differently from the embodiment of FIG. 1. Moreover, it will be appreciated that FIG. 1 schematically illustrates the turbocharger system 100, the valve structure 190, the IC engine 125, and other components. Therefore, these components are not necessarily drawn to scale.

Figure 2:
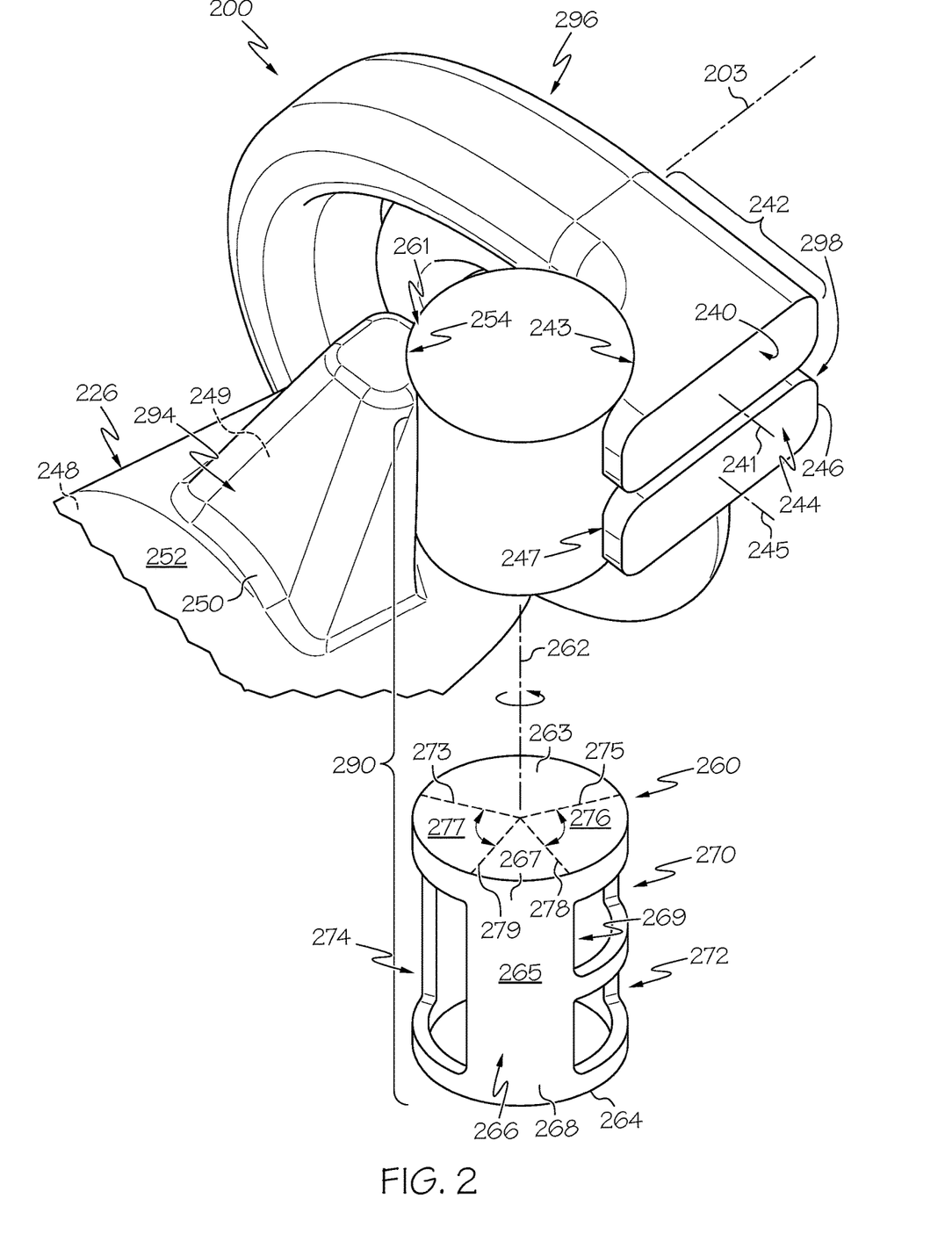
FIG. 2 is an exploded perspective view of the turbocharger system according to example embodiments of the present disclosure, wherein a valve member is oriented in a first position.
Figure 3:
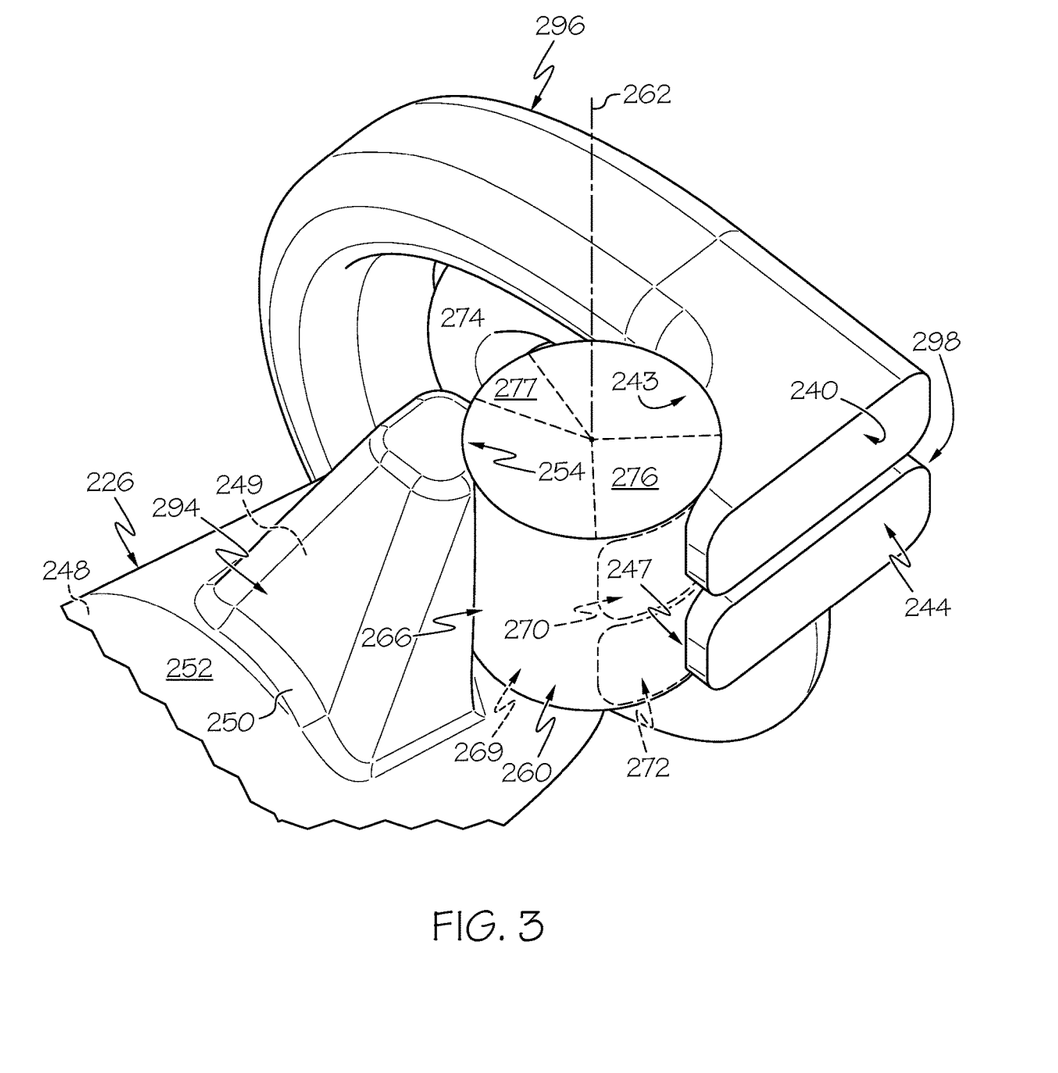
FIG. 3 is a perspective view of the turbocharger system of FIG. 2, wherein the valve member is disposed in a second position.
Figure 4:
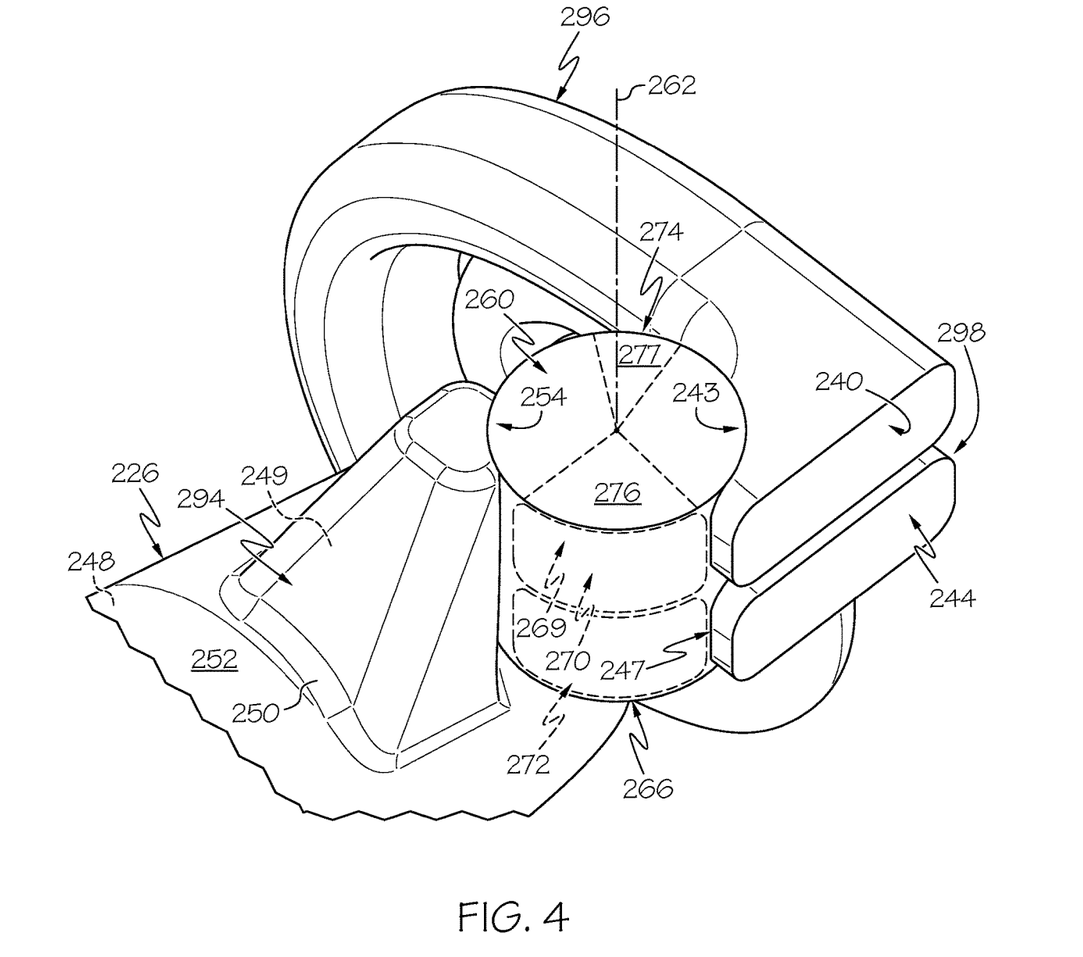
FIG. 4 is a perspective view of the turbocharger system of FIG. 2, wherein the valve member is disposed in a third position.

Referring now to FIGS. 2-4, the turbocharger system 200 will be discussed according to example embodiments. The turbocharger system 200 may include similar features to those discussed above in relation to FIG. 1. The description of features described above will not be repeated for purposes of brevity. Components that correspond to those of FIG. 1 are indicated in FIGS. 2-4 with corresponding reference numbers increased by 100.

The turbocharger system 200 may include the first volute structure 296 and the second volute structure 298. The first volute structure 296 and the second volute structure 298 may be disposed in a twin scroll arrangement.

The first volute structure 296 may be a volute structure with a first volute passage 240 defined therein. The first volute passage 240 may extend along a first axis 241 about the axis 203 of rotation of the turbine wheel. (The turbine wheel is hidden in FIGS. 2-4 but may be configured similar to the turbine wheel 111 of FIG. 1). The first volute passage 240 may include an inlet segment 242, and the first volute passage 240 may extend in a downstream direction along the first axis 241. The first axis 241 may be substantially straight along the inlet segment 242; however, the first axis 241 may spiral about the axis 203 further downstream in the first volute passage 240. Also, the cross sectional area of the first volute passage 240 (taken normal to the axis 241) may be larger than the cross sectional area further downstream.

Furthermore, the first volute structure 296 may include a first branch aperture 243. The first branch aperture 243 may be an opening, hole, or other aperture extending through the wall of the first volute structure 296 in the inlet segment 242. The first branch aperture 243 may have a variety of shapes and may be disposed in various locations on the first volute structure 296 without departing from the scope of the present disclosure.

Likewise, the second volute structure 298 may be a volute structure with a second volute passage 244 defined therein. The second volute passage 244 may extend along a second axis 245 about the axis 203 of rotation of the turbine wheel. The second volute passage 244 may include an inlet segment 246, which is substantially similar to the inlet segment 242 of the first volute passage 240.

Furthermore, the second volute structure 298 may include a second branch aperture 247. The second branch aperture 247 may be an opening, hole, or other aperture extending through the wall of the second volute structure 298 in the inlet segment 246. The second branch aperture 247 may have a variety of shapes and may be disposed in various locations on the second volute structure 298 without departing from the scope of the present disclosure.

As shown, the first and second structures 296, 298 may be compactly arranged in a twin scroll arrangement. It will be appreciated that, in some embodiments, a single turbine housing (such as the turbine housing 105 of FIG. 1) may define both the first and second structures 296, 298 (and, thus, both the first and second volute passages 240, 244). Also, it will be appreciated that the first volute structure 296 may be attached to an upstream exhaust pipe (such as the upstream exhaust pipe 193 of FIG. 1) with the inlet segment 242 of the first volute passage 240 fluidly connected to receive exhaust gas therefrom. Likewise, the second volute structure 298 may be attached to another upstream exhaust pipe (such as the upstream exhaust pipe 195 of FIG. 1) with the inlet segment 246 fluidly connected to receive exhaust gas therefrom.

As shown in FIG. 2, the downstream exhaust structure 226 may extend generally parallel to the axis 203. The exhaust structure 226 may be a hollow, elongate pipe that defines a downstream exhaust passage 248 therein.

The bypass structure 294 may be a thin-walled and hollow structure that defines a bypass passage 249 therein. In some embodiments, the bypass structure 294 may have a shape that is frusto-conic or that resembles a truncated pyramid. A base 250 may be attached to an outer surface 252 of the downstream exhaust structure 226, and the bypass structure 294 may project radially from the outer surface 252. The bypass structure 294 may also taper such that the cross sectional area gradually reduces as the bypass structure 294 extends further away from the surface 252. The hollow interior bypass passage 249 may be in fluid communication with the downstream exhaust passage 248, proximate the base 250. In other words, the bypass passage 249 may be open to the downstream exhaust passage 248 proximate the base 250. Furthermore, the bypass structure 294 may include a bypass aperture 254 (i.e., a bypass passage inlet). The bypass aperture 254 may be an opening, a hole, a slot, or other aperture. The bypass aperture 254 may be disposed along a side of the bypass structure 294. As will be discussed, at least part of a bypass flow path may be defined from the bypass aperture 254, through the bypass passage 249 toward the base 250, and into the downstream exhaust passage 248.

The valve structure 290 may generally include a valve member 260 and a support structure 261. The support structure 261 may be hollow and generally cylindrical in some embodiments. Also, the support structure 261 may be fixedly attached to the bypass structure 294, the first volute structure 296, and/or the second volute structure 298. The valve member 260 may be supported for movement relative to the support structure 261 and, thus, supported for movement relative to the bypass structure 294, the first volute structure 296, and the second volute structure 298. In some embodiments, the valve member 260 may be supported for rotation about a longitudinal axis 262. The valve member 260 may be oriented such that the axis 262 extends transverse to the incoming flow into the volute passage 240 and the second volute passage 244. In some embodiments, for example, the axis 262 may be substantially perpendicular to the axis 241 of the first volute passage 240 and the axis 245 of the second volute passage 244.

The valve member 260 is shown exploded from the support structure 261 for clarity in FIG. 2. The valve member 260 may be generally cylindrical and hollow in some embodiments. Stated differently, the valve member 260 may include an outer wall 266 that defines the outer and inner surfaces of the valve member 260. In some embodiments, the outer wall 266 may be a unitary, one-piece member. In other embodiments, the outer wall 266 may be assembled from a plurality of parts.

In some embodiments, the outer wall 266 may comprise a first end member 263, a second end member 264, and a side member 265 that extends along the axis 262 between the first and second end members 263, 264. The first end member 263 may be disposed proximate a first end 267 of the valve member 260, and the second end member 264 may be disposed proximate a second end 268 of the valve member 260. Accordingly, the first and second end members 263, 264 may be separated along the axis 262 with the axis 262 extending through both. The side member 265 may encircle the axis 262 annularly in a circumferential direction. In some embodiments, the first and/or second end members 263, 264 (as well as the cross section of the side member 265) may be substantially circular. Also, in some embodiments, the first and second end members 263, 264 and the side member 265 may be centered with respect to the axis 262. Accordingly, the outer wall 266 of the valve member 260 may have a shape corresponding to a right circular cylinder.

In some embodiments, the outer wall 266 may also define one or more valve passages 269 within the valve member 260. As shown in the embodiment of FIG. 2, for example, the valve member may include a single valve passage 269, which comprises the hollow interior of the valve member 260 as defined by the inner surfaces of the outer wall 266. Also, as shown, the outer wall 266 may have a wall thickness that is substantially constant; therefore, the valve passage 269 may define a cylindrical volumetric space. However, it will be appreciated that the valve member 260 may include internal surface features, contoured surfaces, channels, and the like such that the valve passage 269 may have a variety of shapes without departing from the scope of the present disclosure. Also, as will be discussed in detail below, the valve member 260 may include more than one distinct valve passage 269 without departing from the scope of the present disclosure.

The valve member 260 may further include one or more first apertures, namely an upper aperture 270 and a lower aperture 272 that extend radially through the side member 265 of the outer wall 266 to provide access into the valve passage 269. The upper aperture 270 may be disposed proximate the first end 267 of the valve member 260, and the lower aperture 272 may be disposed proximate the second end 268 of the valve member 260. In some embodiments, the upper and lower apertures 270, 272 may be substantially rectangular in shape. Also, the upper and lower apertures 270, 272 may have substantially similar sizes. However, it will be appreciated that the shape and size of the upper and lower apertures 270, 272 may vary from those shown and described without departing from the scope of the present disclosure.

Furthermore, the valve member 260 may include a second aperture 274. The second aperture 274 may extend radially through the side member 265 of the outer wall 266 to provide access out of the valve passage 269. The second aperture 274 may extend between both the first end 267 and the second end 268 of the valve member 260. In some embodiments, the second aperture 274 may be substantially rectangular in shape; however, it will be appreciated that the shape of the second aperture 274 may have any suitable shape and size without departing from the scope of the present disclosure.

In some embodiments, the upper and lower apertures 270, 272 may be disposed within a first sector 276 of the valve member 260 with respect to the axis 262. The second aperture 274 may be disposed within a second sector 277 of the valve member 260 with respect to the axis 262. As shown in FIG. 2, the first sector 276 may be defined between a first radial plane 275 and a second radial plane 278. Meanwhile, the second sector 277 may be defined between a third radial plane 273 and a fourth radial plane 279. In some embodiments, the first sector 276 may be larger (as measured in the circumferential direction about the axis 262) than the second sector 277. As will be discussed, the valve member 260 may be supported for rotation relative to the first and second volute structures 296, 298 and the bypass structure 294. Rotation of the valve member 260 rotates the first and second sectors 276, 277 (and, thus, rotates the apertures 270, 272, 274) relative to these structures 296, 298, 294 to thereby vary flow through the turbocharger system 100 in a controlled manner.

The valve member 260 may be received within the support structure 261. Also, at least part of the first end 267 of the valve member 260 may be received within the inlet segment 242 of the first volute passage 240. As such, a sector of the first end 267 of the valve member 260 may be exposed within the inlet segment 242. Likewise, at least part of the second end 268 of the valve member 260 may be received within the inlet segment 246 of the second volute passage 244. As such, a sector of the second end 268 of the valve member 260 may be exposed within the inlet segment 246. Moreover, a sector of the valve member 260 may be received and exposed within the bypass passage 249.

The support structure 261 may support the valve member 260 for rotation about the axis 262. For example, the outer surface of the outer wall 266 may slide on the inner surface of the support structure 261 as the valve member 260 rotates about the axis 262. As the valve member 260 rotates, different sectors of the valve member 260 may exposed within the inlet segment 242 of the first volute passage 240, the inlet segment 246 of the second volute passage 244, and the bypass passage 249.

Operation of the turbocharger system 100 will now be discussed with reference to FIGS. 2, 3, and 4. As mentioned, the valve member 260 may rotate about the axis 262 to vary flow through the turbocharger system 100. In some embodiments, the valve member 260 may rotate between at least three positions: the first position represented in FIG. 2, the second position represented in FIG. 3, and the third position represented in FIG. 4. In some embodiments, the valve member 260 may also rotate to one or more additional intermediate positions to progressively change the amount of open area of the upper aperture 270, the lower aperture 272, and the second aperture 274 relative to the first branch aperture 243, the second branch aperture 247, and the bypass aperture 274, respectively. The valve member 260 may be rotated by an actuator (such as the actuator 192 of FIG. 1). Also, rotation of the valve member 260 may be controlled by an ECU (such as the ECU 151 of FIG. 1) based at least partly on condition(s) detected by a sensor (such as the sensor 189 of FIG. 1).

In the first position represented in FIG. 1, the upper aperture 270 of the valve member 260 may be at least partly aligned with (i.e., in fluid communication with) the first branch aperture 243 of the first volute passage 240. Likewise, the lower aperture 272 may be at least partly aligned with the second branch aperture 247 of the second volute passage 244. Furthermore, the second aperture 274 of the valve member 260 may be at least partly aligned with the bypass aperture 254 of the bypass structure 294. In this position, a first volute flow path may be established, allowing exhaust gas to flow through the first volute passage 240 along the axis 241 toward the turbine wheel. Also, a second volute flow path may be established, allowing exhaust gas to flow through the second volute passage 244, along the axis 245 toward the turbine wheel. Additionally, the valve passage 269 may, in this position, provide a cross flow path, wherein exhaust gas may flow between the first and second volute passages 240, 244 via the upper aperture 270 and the lower aperture 272. Moreover, in this first position, the valve passage 269 may provide a bypass flow path, wherein exhaust gas may flow from the first volute passage 240 and/or the second volute passage 244 to the bypass passage 249 via the upper aperture 270, the lower aperture 272, and the second aperture 274.

In the second position represented in FIG. 3, the upper aperture 270 of the valve member 260 may be at least partly aligned with (i.e., in fluid communication with) the first branch aperture 243 of the first volute passage 240. Likewise, the lower aperture 272 may be at least partly aligned with the second branch aperture 247 of the second volute passage 244. However, the second aperture 274 of the valve member 260 may be misaligned with the bypass aperture 254, and instead the outer wall 266 of the valve member 260 may cover over the bypass aperture 254. Thus, the valve passage 269 of the valve member 260 may provide the cross flow path, allowing exhaust gas to flow between the first and second volute passages 240, 244 as discussed above with respect to FIG. 2. However, the outer wall 266 of the valve member 260 may block flow to the bypass passage 249 and substantially prevent flow along the bypass flow path.

In the third position represented in FIG. 4, the upper aperture 270 may be misaligned with the first branch aperture 243, and the lower aperture 272 may be misaligned with the second branch aperture 247. As such, the outer wall 266 may block the first and second branch apertures 243, 247. Additionally, the second aperture 274 may be misaligned with the bypass aperture 254, and instead, the outer wall 266 may block the bypass aperture 254. Accordingly, in the position of FIG. 4, the outer wall 266 of the valve member 260 may prevent flow along the cross flow path (i.e., flow between the first and second volute passages 240, 244). Likewise, the outer wall 266 of the valve member 260 may prevent flow along the bypass flow path (i.e., flow from the first and/or second volute passages 240, 244 to the bypass passage 249).

It will be appreciated that the shape, size, dimension, orientation, and/or position of the upper aperture 270, the lower aperture 272, and the second aperture 274 may be configured to provide a desired flow characteristic at one or more angular positions of the valve member 260. For example, as shown in FIG. 3, part of the upper aperture 270 may be aligned with the first branch aperture 243 and part of the lower aperture 272 may be aligned with the second branch aperture 247. Other parts of the upper and lower apertures 270, 272 may be misaligned with the first and second branch apertures 243, 247, respectively. This is in contrast to the position of FIG. 2, wherein a majority of the upper aperture 270 aligns with the first branch aperture 243 and a majority of the lower aperture 272 aligns with the second branch aperture 247. Because of this contrast, the mass flow capacity between the first and second volute passages 240, 244 in the position of FIG. 2 may be greater than the mass flow capacity in the position of FIG. 3. Accordingly, by rotating the valve member 260, the mass flow capacity may be changed and controlled for one or more of the various flow paths of the turbocharger system 100.

Thus, the valve member 260 may be controlled for movement between these various positions (and to positions therebetween) according to current operating conditions. The amount of open, exposed area of the upper aperture 270, the lower aperture 272, and the second aperture 274 may vary as the valve member 260 is rotated to alter flow along the various flow paths. The flow through the turbocharger system 100 may be controlled with precision. Accordingly, engine boost may be provided at a wide variety of operating conditions. Furthermore, forces on the valve member 160 may be distributed fairly evenly across the valve member 160 during operation for effective and accurate controlled movement. Vibration and/or other sources of noise may be reduced as well. Furthermore, the turbocharger system 100 may be relatively compact. Additionally, in some embodiments, the valve member 160 may have a relatively simple, cylindrical shape, which is highly manufacturable.

Referring now to FIGS. 5-9 the turbocharger system 300 is illustrated according to additional embodiments. The turbocharger system 300 may be substantially similar to the embodiment of FIGS. 2-4 except as noted below. Components that correspond to those of FIGS. 2-4 are indicated with corresponding reference numbers increased by 100.

Figure 5:
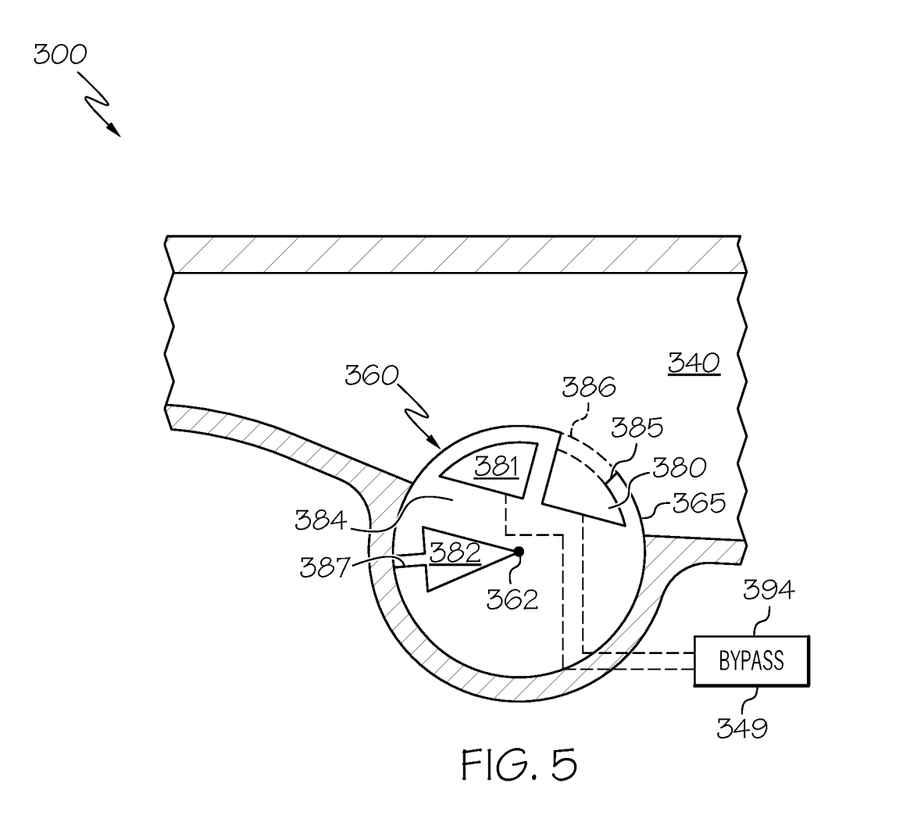
FIG. 5 is a schematic section view of the turbocharger system of the present disclosure according to additional embodiments, which is taken along the section line 5-5 of FIG. 6, and wherein the valve member is shown in a fourth position.
Figure 6:
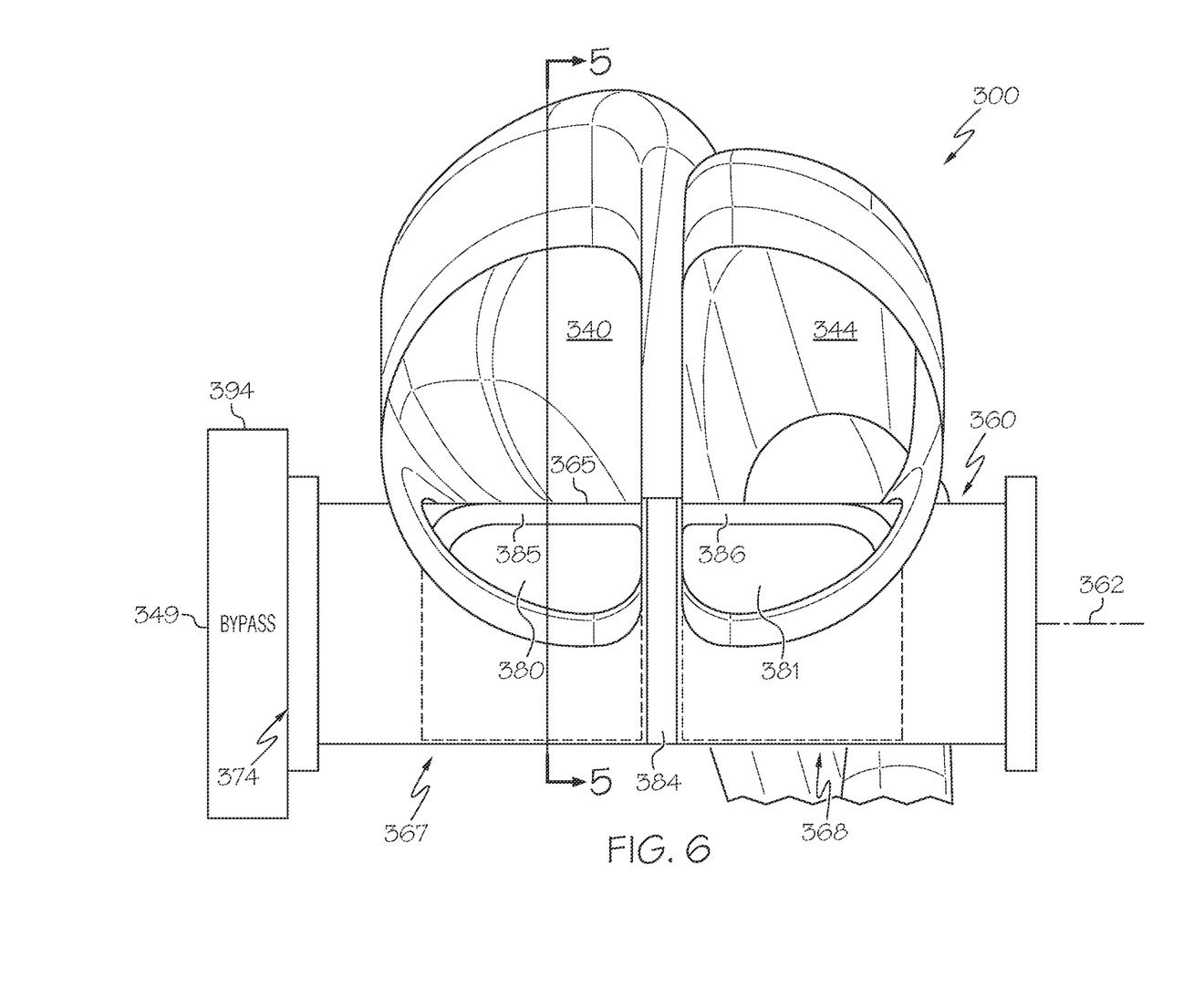
FIG. 6 is an axial view of the turbocharger system of FIG. 5, wherein the valve member is shown in the fourth position.

Referring initially to FIGS. 5 and 6, the valve member 360 may be substantially cylindrical, similar to the embodiments discussed above. The valve member 360 may include a plurality of valve passages therein, which are illustrated schematically. The valve passages may include a first valve passage 380, a second valve passage 381, and a third valve passage 382. The valve passages 380, 381, 382 may extend longitudinally along the axis 362 and may be separated (i.e., fluidly disconnected) from each other by at least one divider wall 384.

The first valve passage 380 may include a first bypass opening 385. The second valve passage 381 may include a second bypass opening 386. The third valve passage 382 may include two or more cross flow openings 387, one of which is in fluid communication with the first volute passage 340 and the other of which is in fluid communication with the second volute passage 344. The first, second, and third openings 385, 386, 387 may be spaced apart in different sectors of the valve member 360 with respect to the axis 362.

Additionally, as shown in FIG. 6, the valve member 360 may include one or more second apertures 374. As shown, the second apertures 374 may be disposed on the first end 367 of the valve member 360. In some embodiments, one second aperture 374 may be fluidly connected to the first valve passage 380, and another second aperture 374 may be fluidly connected to the second valve passage 381. These second apertures 374 may be fluidly connected to the bypass passage 349.

The valve member 360 may be arranged with respect to the volute structures 396, 398 such that the axis 362 extends transverse (e.g., normal) to the incoming flow into the volute passage 340 and the second volute passage 344. The first end 367 may be received and exposed within the first volute passage 340, and the second end 368 may be received and exposed within the second volute passage 344 (FIG. 6). Also, rotation of the valve member 360 may change the exposed area of the valve member 360 within the volute passages 340, 344.

The valve member 360 may rotate to provide one or more of the flow paths described above in relation to FIGS. 2-4. Also, the valve member 360 may provide additional flow characteristics.

When in the position of FIGS. 5 and 6, for example, the first opening 385 (and thus the first valve passage 380) may be fluidly connected to the first volute passage 340, and the second opening 386 (and thus the second valve passage 381) may be fluidly connected to the second volute passage 344. The first valve passage 380 may provide a first bypass flow path from the first volute passage 340 to the bypass passage 349. Also, the second valve passage 380 may provide a second bypass flow path from the second volute passage 344 to the bypass passage 349. It will be appreciated that the valve member 360 may maintain the first and second bypass flow paths fluidly distinct (i.e., fluidly disconnected from each other).

Figure 7:
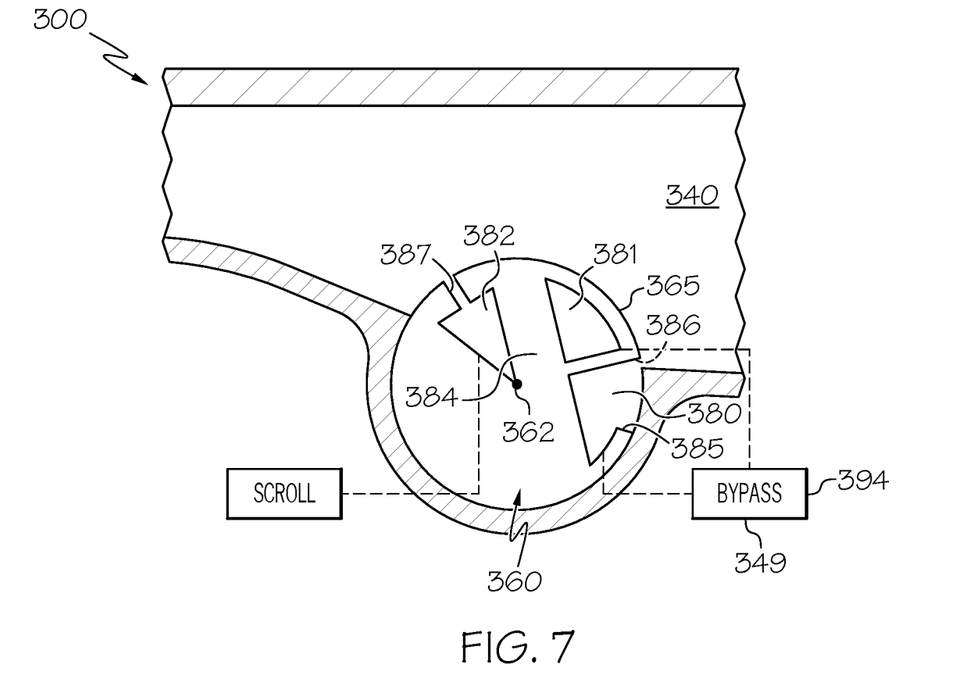
FIG. 7 is a schematic view of the turbocharger system of FIG. 5, wherein the valve member is shown in the first position.

The valve member 360 may also rotate to the position of FIG. 7. In this position, the third opening 387 to the third valve passage 382 may be exposed to the volute passage 340, allowing cross flow between the first and second volute passages 340, 344. Also, at least one of the openings 385, 386 to the first and second valve passages 340, 344 may be exposed within the first and second volute passages 340, 344, respectively. Accordingly, the bypass flow path may be provided. Thus, the configuration of FIG. 7 may correspond to the configuration of FIG. 2.

Figure 8:
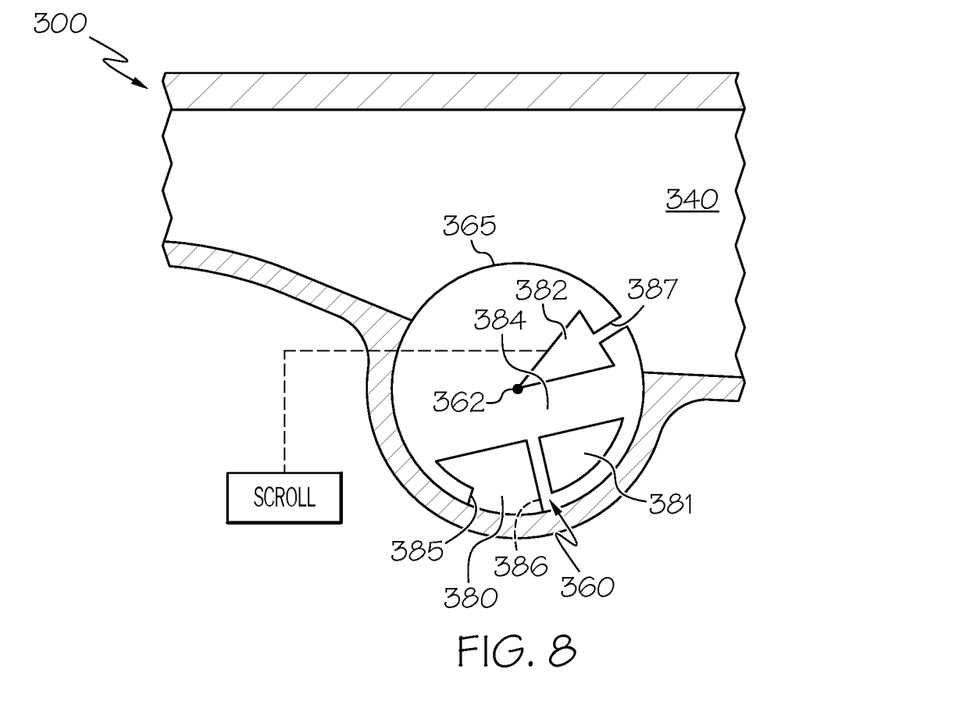
FIG. 8 is a schematic view of the turbocharger system of FIG. 5, wherein the valve member is shown in the second position.

Additionally, in the position of FIG. 8, the third opening 387 may be exposed, allowing cross flow between the first and second volute passages 340, 344. However, the first and second openings 385, 386 may remain unexposed, preventing bypass flow from the volute passages 340, 344. Thus, the configuration of FIG. 8 may correspond to the configuration of FIG. 3.

Figure 9:
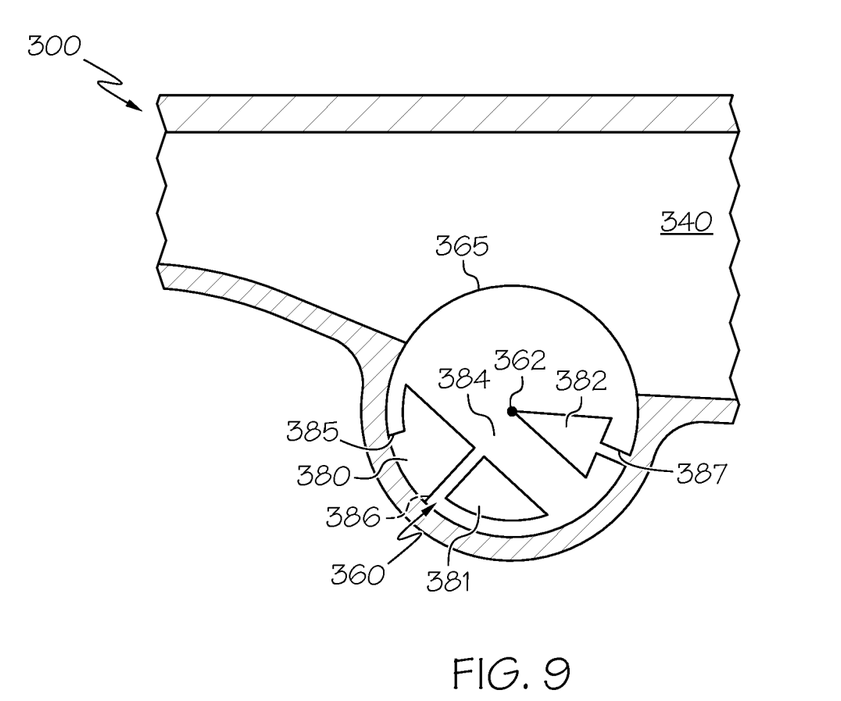
FIG. 9 is a schematic view of the turbocharger system of FIG. 5, wherein the valve member is shown in the third position.

Moreover, in the position of FIG. 9, the openings 385, 386, 387 may be unexposed to the flow within the volute passages 340, 344. Accordingly, cross flow between the volute passages 340, 344 and bypass flow from the volute passages 340, 344 to the bypass passage 349 may be substantially prevented.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger system comprising:
  a turbine section with a turbine wheel, a first volute structure with a first volute passage that extends along a first axis, and a second volute structure with a second volute passage that extends along a second axis, the first volute passage configured to direct flow of exhaust gas toward the turbine wheel, the second volute passage configured to direct flow of exhaust gas toward the turbine wheel;
  a downstream exhaust structure with a downstream exhaust passage configured to receive exhaust gas from the turbine section;

a bypass structure with a bypass passage configured to provide exhaust gas that bypasses the turbine wheel to the downstream exhaust passage;

a valve member including a cross flow valve passage, a first valve passage, and a second valve passage that are fluidly disconnected and separated by at least one divider of the valve member, the valve member being supported for rotation about an axis of rotation between a first position, a second position, and a third position;

wherein the axis of rotation is oriented transverse to the first axis and the second axis;

wherein the cross flow valve passage, with the valve member in the first position, provides a cross flow path between the first volute passage and the second volute passage, the first valve passage provides a first bypass flow path from the first volute passage to the bypass passage, and the second valve passage provides a second bypass flow path from the second volute passage to the bypass passage;

wherein the cross flow valve passage, with the valve member in the second position, provides the cross flow path;

wherein the valve member, in the second position, substantially prevents flow along the first bypass flow path and the second bypass flow path; and wherein the valve member, in the third position, substantially prevents flow along the cross flow path, the first bypass flow path, and the second bypass flow path.

2. The turbocharger system of claim 1, wherein one of the first volute passage and the second volute passage includes a segment;

wherein a cross flow opening to the cross flow valve passage is included in a first sector of the valve member with respect to the axis of rotation;

wherein a second opening to the second valve passage is included in a second sector of the valve member;

wherein the valve member includes an exposed area that is exposed to the segment and an unexposed area that is unexposed to the segment;

wherein the cross flow opening and the second opening are included in the exposed area when the valve member is in the first position;

wherein the cross flow opening is included in the exposed area and the second opening is included in the unexposed area when the valve member is in the second position; and wherein the cross flow opening and the second opening are included in the unexposed area when the valve member is in the third position.

3. The turbocharger system of claim 1, wherein the valve member is supported for rotation about the axis of rotation between the first position, the second position, the third position, and a fourth position;

wherein the valve member, with the valve member in the fourth position, substantially prevents flow along the cross flow path; and wherein the first valve passage provides the first bypass flow path from the first volute passage to the bypass passage with the valve member in the fourth position; and wherein the second valve passage provides the second bypass flow path from the second volute passage to the bypass passage with the valve member in the fourth position.

4. The turbocharger system of claim 1, wherein the valve member includes a first portion and a second portion that are separated along the axis of rotation, the first portion including a first radial opening to the first valve passage, the second portion including a second radial opening to the second valve passage; and wherein the first portion is at least partially received in the first volute passage, and the second portion is at least partially received in the second volute passage.

5. The turbocharger system of claim 1, wherein the axis of rotation is oriented substantially normal to the first axis and the second axis.

6. The turbocharger system of claim 1, wherein the valve member has a substantially cylindrical shape.

7. The turbocharger system of claim 6, wherein the first valve passage and the second valve passage are fluidly connected to the bypass passage at an axial end of the valve member.

8. The turbocharger of claim 1, further comprising:

an actuator configured to actuate the valve member between the first position, the second position, and the third position;

a sensor configured to detect a condition related to operation of the turbocharger system; and a controller configured to control the actuator based at least partly on the condition detected by the sensor.

9. The turbocharger system of claim 8, wherein the sensor is configured to detect a condition of an engine configured to provide exhaust gas to the first volute passage and the second volute passage.

10. A method of operating a turbine section of a turbocharger system comprising:

operating an engine at a variable condition;

detecting a current state of the variable condition; and selectively actuating a valve member in rotation about an axis between a first position, a second position, and a third position relative to a first volute structure, a second volute structure, and a bypass structure based at least partly on the detected current state of the variable condition;

wherein the first volute structure defines a first volute passage, the second volute structure defines a second volute passage, and the bypass structure defines a bypass passage;

wherein the axis is oriented transverse to a first flow axis of the first volute passage and a second flow axis of the second volute passage;

wherein the valve member includes a cross flow valve passage, a first valve passage, and a second valve passage that are fluidly disconnected and separated by at least one divider of the valve member;

wherein actuating the valve member includes actuating the valve member to the first position in which the cross flow valve passage provides a cross flow path between the first volute passage and the second volute passage, the first valve passage provides a first bypass flow path from the first volute passage to the bypass passage, and the second valve passage provides a second bypass flow path from the second volute passage to the bypass passage;

wherein actuating the valve member includes actuating the valve member to the second position in which the cross flow valve passage provides the cross flow path, and the valve member substantially prevents flow along the first bypass flow path and the second bypass flow path; and wherein actuating the valve member includes actuating the valve member to the third position in which the valve member substantially prevents flow along the cross flow path, the first bypass flow path, and the second bypass flow path.

11. The method of claim 10, wherein the variable condition is a speed of the engine; and
wherein detecting the current state includes detecting a current speed of the engine.

12. The method of claim 10, wherein one of the first volute passage and the second volute passage includes a segment;
wherein a cross flow opening to the cross flow valve passage is included in a first sector of the valve member with respect to the axis of rotation;
wherein a second opening to the second valve passage is included in a second sector of the valve member;
wherein the valve member includes an exposed area that is exposed to the segment and an unexposed area that is unexposed to the segment;
wherein the cross flow opening and the second opening are included in the exposed area when the valve member is in the first position;
wherein the cross flow opening is included in the exposed area and the second opening is included in the unexposed area when the valve member is in the second position; and
wherein the cross flow opening and the second opening are included in the unexposed area when the valve member is in the third position.

13. The method of claim 10,
wherein the valve member is supported for rotation about the axis of rotation between the first position, the second position, the third position, and a fourth position;
wherein actuating the valve member includes actuating the valve member to the fourth position in which the valve member substantially prevents flow along the cross flow path, the first valve passage provides the first bypass flow path from the first volute passage to the bypass passage, and the second valve passage provides the second bypass flow path from the second volute passage to the bypass passage.

14. The method of claim 10, wherein the valve member includes a first portion and a second portion that are separated along the axis of rotation, the first portion including a first radial opening to the first valve passage, the second portion including a second radial opening to the second valve passage; and
wherein the first portion is at least partially received in the first volute passage, and the second portion is at least partially received in the second volute passage.

15. The method of claim 10, wherein the axis of rotation is oriented substantially normal to the first axis and the second axis.

16. The method of claim 10, wherein the valve member has a substantially cylindrical shape.

17. The method of claim 16, wherein the first valve passage and the second valve passage are fluidly connected to the bypass passage at an axial end of the valve member.

18. The method of claim 10, wherein detecting the current state includes detecting the current state with a sensor;
further comprising receiving, by a controller, an input from the sensor corresponding to the detected current state; and
further comprising outputting, by the controller, an output to an actuator for selectively actuating the valve member between the first position, the second position, and the third position based at least partly on the input.

19. The method of claim 18, wherein detecting the current state includes detecting a condition of the engine that provides exhaust gas to the first volute passage and the second volute passage.

20. A turbocharger system comprising:
a turbine section with a turbine wheel, a first volute structure with a first volute passage that extends along a first axis toward the turbine wheel, and a second volute structure with a second volute passage that extends along a second axis toward the turbine wheel;
a downstream exhaust structure with a downstream exhaust passage configured to receive exhaust gas from the turbine section;
a bypass structure with a bypass passage configured to provide exhaust gas that bypasses the turbine wheel to the downstream exhaust passage;
a valve member supported at least partly within the first volute passage and the second volute passage for rotation about an axis of rotation between a first position, a second position, a third position, and a fourth position, the valve member having a radial face and an axial end with respect to the axis of rotation;
wherein the valve member includes a plurality of separate valve passages extending through the valve member, the plurality of separate valve passages including a cross flow valve passage that extends between a first cross flow opening in the radial face and a second cross flow opening in the radial face, a first valve passage that extends between a opening in the radial face and a first bypass aperture in the axial end, and a second valve passage that extends between a second opening in the radial face and a second bypass aperture in the axial end;
wherein different portions of the radial face are exposed within the first volute passage and the second volute passage as the valve member rotates between the first, second, third, and fourth positions;
wherein the cross flow valve passage, with the valve member in the first position, provides a cross flow path that fluidly connects the first volute passage and the second volute passage, the first valve passage provides a first bypass flow path that fluidly connects the first volute passage to the bypass passage, and the second valve passage provides a second bypass flow path that fluidly connects the second volute passage to the bypass passage;
wherein the cross flow valve passage, with the valve member in the second position, provides the cross flow path;
wherein the valve member, in the second position, substantially prevents flow along the first bypass flow path and the second bypass flow path;
wherein the valve member, in the third position, substantially prevents flow along the cross flow path, the first bypass flow path, and the second bypass flow path; and
wherein the valve member, in the fourth position, substantially prevents flow along the cross flow path with the first valve passage providing the first bypass flow path and the second valve passage providing the second bypass flow path.

* * * * *